UNITED STATES PATENT OFFICE.

ANSON G. BETTS, OF ASHEVILLE, NORTH CAROLINA.

TREATMENT OF ZINC-BEARING MATERIAL CONTAINING IRON.

1,259,594.   Specification of Letters Patent.   Patented Mar. 19, 1918.

No Drawing.   Application filed April 21, 1916.   Serial No. 92,659

*To all whom it may concern:*

Be it known that I, ANSON G. BETTS, a citizen of the United States, residing at Asheville, in the county of Buncombe and State of North Carolina, have invented certain new and useful Improvements in the Treatment of Zinc-Bearing Material Containing Iron, of which the following is a full, clear, and exact description.

This invention relates to obtaining zinc in metallic form from zinc ores containing iron, particularly by leaching or lixiviating the roasted or oxidized ore with sulfuric or other acid to dissolve the zinc, followed by suitable treatment, as by electrolysis, of the resulting solution to remove the zinc in metallic form. The chief object of the invention is to secure a high percentage of extraction of the zinc present. To this and other ends the invention consists in the novel features hereinafter described.

In treating roasted or oxidized zinc ore with dilute acid, for example sulfuric, I prefer to proceed first according to the method described and claimed broadly in my prior Patent No. 1,066,245, dated July 1, 1913. This method involves leaching or lixiviating with the dilute acid, in the presence of an oxidizing agent stronger in its oxidizing action than ferric salt of the said acid, whereby considerable zinc is dissolved, but not all; part remaining undissolved in accordance with a current theory that zinc oxid and iron oxid in combination exist in a form insoluble in sulfuric acid. The method referred to is fully explained in my prior patent mentioned, and hence need not be further described here. It is to the recovery of this residual portion of the zinc that my present invention is particularly directed. Accordingly I treat the undissolved residue with (preferably) sulfuric acid under conditions favorable for the extraction of practically all the zinc present. For such purpose, I prefer to maintain, in the leaching solution, reducing conditions (in distinction to oxidizing or neutral conditions), and considerable concentration of the acid. As an example, I prefer to use a solution of sulfuric acid of from five to twenty per cent. strength, with the addition of sulfurous acid, which latter may be cheaply and conveniently obtained in the form of gas from the roasting furnaces of almost any metallurgical plant.

The above treatment of the previously lixiviated ore dissolves more of the zinc, together with more or less iron. Metallic iron (say in the form of scrap), or iron sulfid, or both, can be used instead of or in addition to the sulfurous acid but other reducing agents also are capable of use.

I now, after filtration, have a solution of zinc and iron salts, with or without an excess of free acid. In general I prefer to have the zinc in the form of sulfate and hence prefer to use sulfuric acid for the purpose.

If metallic iron or iron sulfid were not used, or were used in insufficient amount, in the second leaching liquor, the solution is next preferably passed through a tank containing metallic iron, which may be in the form of scrap. The iron serves to neutralize any free acid present, and also reduces to ferrous form any ferric salts not already reduced, and precipitates impurities, such as copper, giving practically a pure solution of zinc and ferrous salts, for example sulfates.

I now have two solutions; one, the product of the first lixiviation, containing much zinc and practically no iron, if any; and one containing less zinc, and considerable iron in the ferrous form. Removal of the zinc in metallic form from the first can be readily effected by electro-deposition, and I have discovered that an electrolytic method can also be economically used with a solution of the zinc and iron salts, such as, for example, the latter of the above two solutions. In electrolyzing the second solution I prefer to use sheet iron cathodes and some form of iron anodes; the procedure being similar to the ordinary copper or lead refining process, zinc being deposited on the cathodes and (when iron anodes are used) iron going into solution. The zinc thus obtained is not chemically pure, but contains a small percentage of iron. The impure metal is marketable without further refining, but I prefer to refine it; for which purpose any suitable electrolytic or furnace-refining method may be employed.

In the electrolytic manufacture of zinc by roasting sulfid ore and lixiviating the product with sulfuric acid, followed by electro-deposition of zinc from the solution, there is a gain in the quantity of sulfuric acid in the solution, which constitutes a by-product; whereas in the second leaching stage of my improved process sulfuric acid is consumed.

I therefore prefer to so proportion the amount of zinc extracted in the two stages that a by-product of sulfuric acid resulting from the first leaching and electrolysis is made available for use in the second leaching. In the second stage of the process (practised according to the preferred mode) metallic iron is consumed in considerable amount, but the electric power requirements are so much less with the soluble iron anodes that the saving in current largely if not entirely compensates for the cost of the iron consumed.

It is to be understood that the invention is not limited to the specific procedure herein described but can be practised in other ways without departure from its spirit.

I claim:—

1. The process of treating oxidized zinc-bearing material containing iron, comprising leaching the material with an acid solution to dissolve the greater portion of the zinc with a minimum of iron; leaching the residue with an acid solution for extraction of the remaining zinc, whereby more or less iron is also extracted; and electrolytically recovering zinc from both solutions separately.

2. The process of treating zinc-bearing material, comprising dissolving zinc from an oxidized and once leached ore, by treating the same with an acid solution in the presence of an added reducing agent capable of reducing ferric to ferrous salts, and recovering zinc from the resulting solution.

3. The process of treating leached oxidized zinc-bearing material, comprising dissolving zinc from the material by means of an acid solution in the presence of a reducing agent capable of reducing ferric to ferrous salts, and electrolyzing the resulting solution with iron anode to recover zinc.

4. The process of treating leached oxidized zinc-bearing material, comprising dissolving zinc from the material by means of a solution containing a material percentage of sulfuric acid in the presence of sulfurous acid, and electrolyzing the resulting solution to recover zinc therefrom.

5. The process of treating material containing zinc and iron oxids, which consists in extracting zinc therefrom by means of an acid solution, removing in solution proportionately less of the iron present than of the zinc, and extracting further quantities of zinc from the undissolved residue with an acid solution simultaneously dissolving a relatively greater amount of iron as compared to the zinc dissolved, than in the first extraction, and electrodepositing zinc containing iron from the latter of said solutions produced.

6. A process of treating ferruginous zinkiferous material which comprises leaching the same with a stable mineral acid in the presence of sulfur dioxid, treating the residual solution with a metallic reducing agent, and thereafter electrolyzing the solution.

7. A process of treating ferruginous zinkiferous material which comprises leaching the same with a stable mineral acid in the presence of sulfur dioxid, treating the residual solution with metallic iron, and thereafter electrolyzing the solution.

In testimony whereof I affix my signature.

ANSON G. BETTS.

Copies of this patent may be obtained for five cents each, by addressing the "Commissioner of Patents, Washington, D. C."